United States Patent
Ales et al.

[11] Patent Number: 5,047,204
[45] Date of Patent: Sep. 10, 1991

[54] NUCLEAR FUEL ELEMENT FOR A PARTICLE BED REACTOR

[75] Inventors: Matthew W. Ales, Amherst; John D. Malloy, III, Lynchburg, both of Va.

[73] Assignee: The Babcock & Wilcox Company, New Orleans, La.

[21] Appl. No.: 616,951

[22] Filed: Nov. 21, 1990

[51] Int. Cl.$^5$ ............................................. G21C 3/30
[52] U.S. Cl. .................................. 376/430; 376/431; 376/382; 376/299; 376/424
[58] Field of Search ............... 376/430, 431, 424, 380, 376/381, 382, 383, 428, 299

[56] References Cited

U.S. PATENT DOCUMENTS

| | | | |
|---|---|---|---|
| 4,144,723 | 3/1979 | Morse et al. | 62/332 |
| 4,243,487 | 1/1981 | Schweiger | 376/298 |
| 4,382,908 | 5/1983 | Petersen | 376/299 |
| 4,554,129 | 11/1985 | Peinado et al. | 376/298 |
| 4,678,626 | 7/1987 | Germer | 376/296 |
| 4,689,194 | 8/1987 | Wachholz et al. | 376/299 |
| 4,759,911 | 7/1988 | Bingham et al. | 376/428 |
| 4,788,031 | 11/1988 | Becker et al. | 376/296 |
| 4,847,040 | 7/1989 | Becker et al. | 376/299 |
| 4,911,881 | 3/1990 | Demars | 376/430 |

Primary Examiner—Donald P. Walsh
Assistant Examiner—Meena Chelliah
Attorney, Agent, or Firm—R. J. Edwards; D. Neil LaHaye

[57] ABSTRACT

A nuclear fuel element for a particle bed reactor. Concentric inner and outer porous cylinders attached at either end define an annulus therebetween that contains a fuel particle bed of nuclear fuel material. The outer porous cylinder is provided with fins that extend radially outward along its entire length. A nonporous cylinder is attached to the outer porous cylinder at either end and is positioned around the outer porous cylinder so as to be concentric therewith. Flexible fins extend radially inward form the nonporous cylinder along its entire length and contact the fins on the outer porous cylinder for conduction of heat to heat removal tubes on the outer surface of the nonporous cylinder. The heat removal tubes allow bimodal cooling of the particle bed reactor.

6 Claims, 2 Drawing Sheets

NUCLEAR FUEL ELEMENT FOR A PARTICLE BED REACTOR

BACKGROUND OF THE INVENTION

1. Field of the Invention

The present invention is generally related to nuclear fuel elements and in particular to nuclear fuel elements used in particle bed reactors.

2. General Background

Particle Bed Reactors (PBR's) are cooled by pressurized gas that flows through the fuel elements. Each fuel element in a PBR is formed from two porous cylinders of different sizes. The smaller cylinder is positioned inside and concentric with the larger cylinder to define an annular space therebetween. The smaller and larger cylinders are commonly referred to in the industry as the inner and outer frits respectively. The annular space between the cylinders serves as the fuel bed by retaining nuclear fuel between the two cylinders. The nuclear fuel in the annular space is typically in the form of spherical particles of nuclear fuel material that are approximately 0.5 millimeter (500 microns) in diameter with each particle being coated to prevent the release of fission gas products during reactor operations. Cooling of the fuel elements is accomplished by directing the primary gas coolant through the outer cylinder so that it flows radially inward through the fuel particle bed and through the inner cylinder into the interior of the inner cylinder and then axially out the interior of the inner cylinder to heat exchange devices for converting the heat in the primary coolant to useful energy. Nuclear reactors may use either an open cycle system where the power fluid or coolant is used only once and replaced with fresh fluid or a closed cycle system where the same power fluid or coolant is used repeatedly. In order for an open cycle system to also be used as a closed cycle system (bimodal operation), it has been necessary to provide heavy, high-temperature valving to switch between the systems. Also, in gas-cooled particle bed reactors, it has been necessary to continue flow of the main coolant in order to remove decay heat from the reactor. Nuclear reactors and cooling systems which applicants are aware of include the following.

U.S. Pat. No. 4,847,040 discloses a liner cooling system for a high temperature gas-cooled reactor where the liner cooling system is arranged on the inside of the prestressed concrete pressure vessel for removal of decay heat.

U.S. Pat. No. 4,243,487 discloses a gas-cooled high temperature nuclear reactor where the steam generator includes a heat exchanger at least a portion of which is located above the reactor core to insure a natural convection flow of primary coolant for removal of decay heat when the reactor is shut down and the blowers are not functioning.

U.S. Pat. No. 4,382,908 discloses an after-heat removal system for a gas-cooled nuclear reactor in which the core is formed by a pile of spherical nuclear fuel elements. An outlet for gas carrying the after heat from the pile is provided in the side reflector in spaced relationship from the gas inlet and the gas outlet and opens within the pile and leads to a cooler which is in turn connected to the gas inlet of the reactor.

U.S. Pat. No. 4,689,194 discloses a gas-cooled nuclear reactor in which the core is formed by a pile of spherical nuclear fuel elements with a plurality of decay heat exchangers located in the steel pressure vessel and connected on the cooling water side with an external re-cooling heat exchanger each in a geodetically higher location for heat removal by natural convection.

U.S. Pat. No. 4,788,031 discloses the use of a plurality of cooling pipes mounted on the concrete jacket side of a liner with water flowing through the pipes for removal of decay heat from the nuclear reactor.

U.S. Pat. No. 4,144,723 is of general interest regarding primary and secondary cooling systems but does not disclose decay heat removal from a particle bed reactor.

U.S. Pat. No. 4,795,607 discloses a high temperature gas-cooled nuclear reactor having cooling tubes on the exterior of the vessel.

U.S. Pat. No. 4,678,626 discloses a liquid-metal pool breeder reactor with a surrounding shell around the containment vessel and fins that extend from the shell into the air space between it and the containment vessel. The fins are heated by radiation from the containment vessel and convect the heat to circulating air.

U.S Pat. No. 4,554,129 discloses a gas-cooled nuclear reactor wherein decay heat is removed by cooling tubes welded to the exterior or concrete side of the reactor vessel by conduction through the vessel liner.

Although a variety of gas-cooled reactors are known, none provide for bimode operation where an open or closed cycle system may easily be converted to the other or for the removal of heat generated at low power such as decay heat to generate low levels of continuous power.

SUMMARY OF THE INVENTION

The present invention, addresses the above need in a straightforward manner. What is provided is a nuclear fuel element for a particle bed reactor capable of operating in an open or closed cycle system. The fuel element is formed from two porous cylinders of different diameter. The smaller cylinder is placed inside and concentric with the larger cylinder to define an annulus therebetween. The spherical nuclear fuel particles are retained in the annulus between the cylinders. The outer cylinder is provided with a plurality of fins on its outer surface that extend over the full length of the cylinder. The structure formed by the inner and outer cylinders is positioned inside and concentric with a rigid nonporous cylinder having a plurality of flexible fins that extend along the full length of its inner surface and are in contact with the fins on the outer cylinder. A plurality of tubes are provided on the outer surface of the nonporous cylinder that run along its entire length. During normal reactor operations, primary coolant is circulated into the annulus between the nonporous cylinder and the outer cylinder, radially through the fuel particles in the annulus between the inner and outer porous cylinders, and axially out of the interior of the inner porous cylinder. Removal of decay heat in a different mode from normal reactor operations, either open or closed cycle, without the need for forced circulation of primary coolant, is accomplished by heat conduction through the two sets of fins to the tubes on the outside of the nonporous cylinder where a different coolant is circulated. This allows bimodal operation without the need for heavy, high temperature valving and equipment associated therewith. dr

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
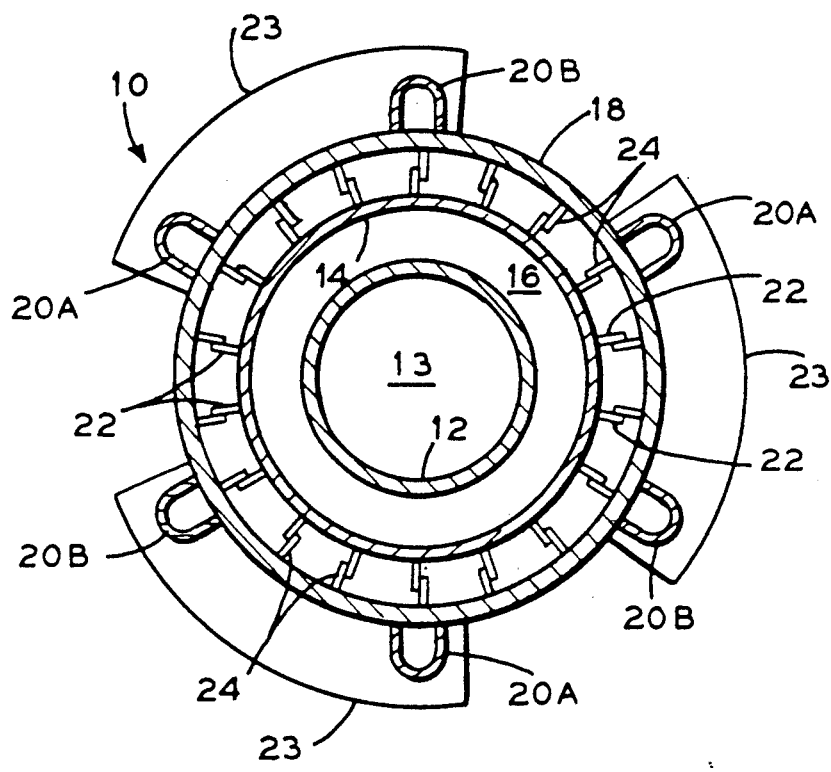
FIG. 1 is a top sectional view of the invent
Figure 2:
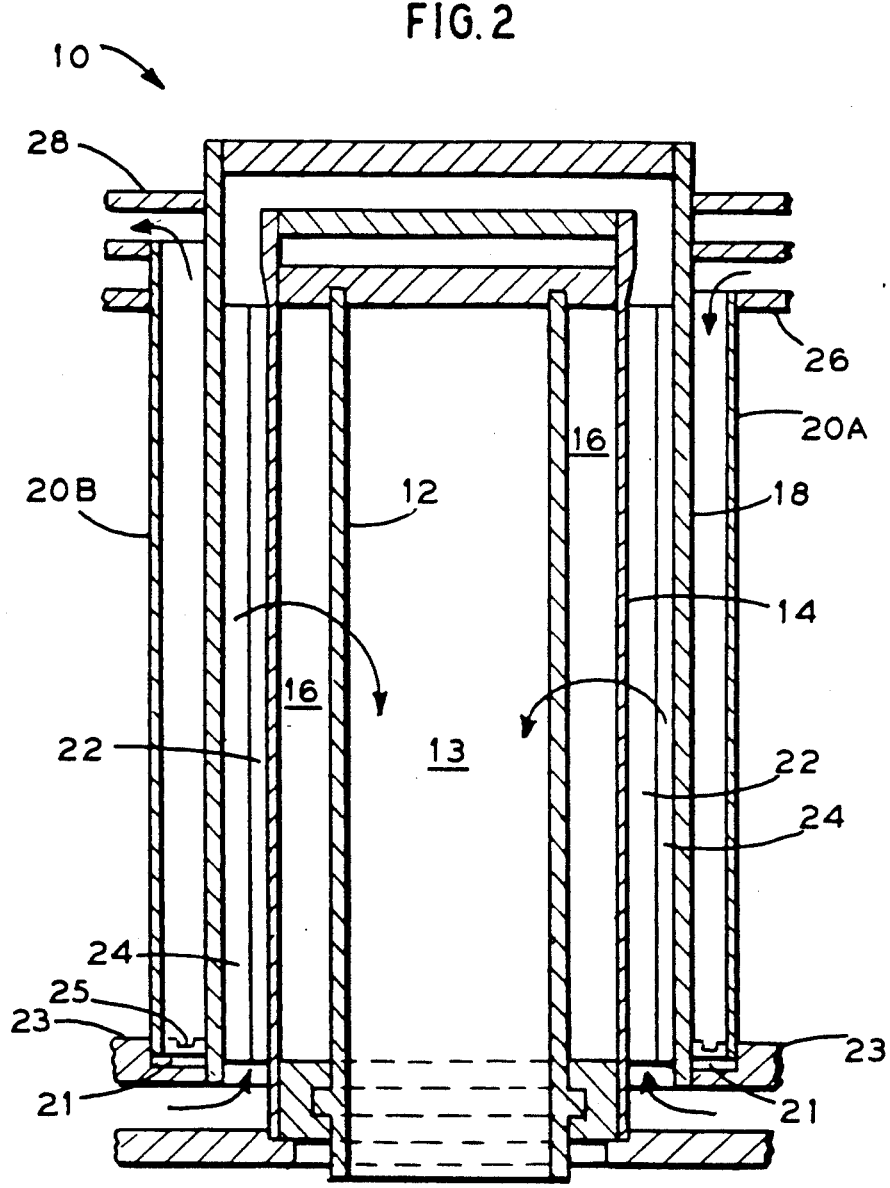
FIG. 2 is a side sectional view of the invention.

Referring to FIG. 1 and FIG. 2, it is seen that the invention is generally indicated by the numeral 10. Nuclear fuel element 10 is generally comprised of inner porous cylinder 12, outer porous cylinder 14, fuel particle bed 16, nonporous cylinder 18, and heat removal tubes 20.

Inner porous cylinder 12 and outer porous cylinder 14 are both formed from material suitable for use in nuclear reactor conditions. Each cylinder is porous to allow gas coolant to flow therethrough. However, the pores in each cylinder must be smaller than the individual spherical fuel particles retained in the annulus between the cylinders that forms fuel particle bed 16. Outer cylinder 14 is connected at either end to and concentric with inner cylinder 12 to define an annulus therebetween that serves as fuel particle bed 16. The fuel particles in fuel particle bed 16 are well known in the industry and are formed from spherical particles of nuclear fuel material that are approximately 0.5 mm (500 microns) in diameter with each particle being coated to prevent the release of fission gas products during reactor operations.

Means for conducting decay heat away from fuel particle bed 16 when the primary gas coolant is not circulated through the reactor and fuel element 10 is provided in the form of a plurality of fins 22 on the outer surface of outer porous cylinder 14 that extend radially outward therefrom and along the full length thereof.

Nonporous cylinder 18 is larger in diameter than outer porous cylinder 14 and is positioned around and concentric with outer porous cylinder 14. During normal reactor operations the annulus between outer porous cylinder 14 and nonporous cylinder 18 receives primary gas coolant by forced circulation that then flows radially through outer porous cylinder 14, fuel particle bed 16, and inner porous cylinder 12 (indicated by arrows in FIG. 2), and then axially out the interior 13 of inner porous cylinder 12.

Nonporous cylinder 18 is provided with a plurality of flexible fins 24 on its inner surface that extend radially inward and along the entire length of nonporous cylinder 18. The number of flexible fins 24 provided correspond to the number of fins 22 on outer porous cylinder 18. Flexible fins 24 are also positioned and sized to extend radially inward a sufficient distance so as to be in constant contact with fins 22 even when radial and axial expansion and contraction of outer porous cylinder 14 that occurs during reactor operations is accounted for. In this manner, decay heat received by fins 22 is conducted to flexible fins 24 and nonporous cylinder 18.

Removal of decay heat transferred to nonporous cylinder 18 is accomplished by a plurality of heat removal tubes 20 attached to the outer surface of nonporous cylinder 18. As seen in FIG. 1 and 2, heat removal tubes 20 extend along the entire length of nonporous cylinder 18 and are formed from substantially U-shaped members attached to nonporous cylinder 18. Heat removal tubes 20 are preferably arranged as pairs of adjacent tubes 20A and 20B. For ease of illustration, FIG. 2 does not show adjacent tubes 20A and 20B but does show each type of tube, the purpose of which will be explained. Each heat removal tube 20A and 20B is open at its upper and lower ends and are in fluid communication with each other at their lower ends via coolant passage 21. Coolant passage 21 is formed by plate 23. Plate 23 is attached adjacent the bottom of nonporous cylinder 18 around its outer circumference (seen in FIG. 2) between adjacent tubes 20A and 20B (seen in FIG. 1). Plate 23 is provided with a horizontal U-shaped slot 25 that faces radially inward toward nonporous cylinder 18 and defines a passage when plate 23 is attached to nonporous cylinder 18. The lower open ends of tubes 20A and 20B penetrate plate 23 adjacent opposite ends, placing the tubes in fluid communication via plate 23. Inlet header 26 is attached adjacent the upper end of and in fluid communication with heat removal tube 20A. Outlet header 28 is attached adjacent the upper end of and in fluid communication with heat removal tube 20B. As indicated by the arrows in FIG. 2, a second coolant is directed through inlet header 26 down into heat removal tube 20A, through coolant passage 21 to heat removal tube 20B, up through heat removal tube 20B, and through outlet header 28. A second coolant is circulated through the interior of each tube 20 for removal of decay heat while primary coolant is not being forcibly circulated through the system. Heat removal tubes 20 may be part of either an open or closed cycle system to provide bimode operation capability without the need for heavy, high-temperature valving.

In operation, cooling of a particle bed reactor and production of useful energy during normal high power operations is accomplished by forced circulation of primary gas coolant into the annulus between nonporous cylinder 18 and then radially through outer porous cylinder 14, fuel particle bed 16, and inner porous cylinder 12, and then axially out the interior 13 of inner porous cylinder 12 to heat exchange devices in a manner known in the art. This may be operated as an open cycle system. During periods of low power operation or buildup of decay heat when there is little or no circulation of primary coolant, a second coolant may be circulated through heat removal tubes 20 as described above in a closed cycle system to generate low levels of continuous power. Heat is conducted to heat removal tubes 20 by fins 22 on outer porous cylinder 14 and flexible fins 24 on nonporous cylinder 18.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A nuclear fuel element for a particle bed reactor, comprising:
   a. an inner porous cylinder;
   b. an outer porous cylinder connected at either end to and concentric with said inner porous cylinder, defining an annulus therebetween;
   c. a fuel particle bed in said annulus between said inner and outer porous cylinders;
   d. a plurality of fins extending radially outward from said outer porous cylinder;

e. a nonporous cylinder concentric with and positioned around said outer porous cylinder, defining an annulus therebetween;
f. a plurality of flexible fins extending radially inward from said nonporous cylinder and in contact with said fins on said outer porous cylinder; and
g. a plurality of heat removal tubes attached to the outer surface of said nonporous cylinder.

2. The nuclear fuel element of claim 1, wherein said fins on said outer porous cylinder extend along the full length thereof.

3. The nuclear fuel element of claim 1, wherein said flexible fins extend along the full length of said nonporous cylinder.

4. The nuclear fuel element of claim 1, wherein said heat removal tubes extend along the full length of said nonporous cylinder.

5. A nuclear fuel element for a particle bed reactor, comprising:
a. an inner porous cylinder;
b. an outer porous cylinder connected at either end to and concentric with said inner porous cylinder, defining an annulus therebetween;
c. a fuel particle bed in said annulus between said inner and outer porous cylinders;
d. a plurality of fins extending radially outward from and along the entire length of said outer porous cylinder;
e. a nonporous cylinder attached at either end to and positioned around said outer porous cylinder so as to be concentric therewith, defining an annulus therebetween;
f. a plurality of flexible fins extending radially inward from and along the entire length of said nonporous cylinder and in contact with said fins on said outer porous cylinder; and
g. a plurality of heat removal tubes attached to the outer surface of said nonporous cylinder.

6. The nuclear fuel element of claim 5, wherein said heat removal tubes extend along the full length of said nonporous cylinder.

* * * * *